United States Patent
Merlin (10) Patent No.: US 9,942,858 B1
(45) Date of Patent: Apr. 10, 2018

(54) METHOD FOR LINK ADAPTATION AND POWER AMPLIFIER VOLTAGE CONTROL AND SYSTEM THEREFOR

(71) Applicant: FREESCALE SEMICONDUCTOR, INC., Austin, TX (US)

(72) Inventor: Marco Merlin, Valbonne (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/279,610

(22) Filed: Sep. 29, 2016

(51) Int. Cl.
*H04B 17/309* (2015.01)
*H04W 52/26* (2009.01)
*H04L 1/00* (2006.01)
*H04W 52/24* (2009.01)
*H04W 52/20* (2009.01)
*H04W 52/28* (2009.01)
*H04W 84/12* (2009.01)

(52) U.S. Cl.
CPC ......... *H04W 52/262* (2013.01); *H04L 1/0009* (2013.01); *H04W 52/20* (2013.01); *H04W 52/241* (2013.01); *H04W 52/245* (2013.01); *H04W 52/267* (2013.01); *H04W 52/283* (2013.01); *H04W 84/12* (2013.01)

(58) Field of Classification Search
CPC .......................... H04B 17/309; H04B 17/0087
USPC ......... 455/127.1, 67.11, 343.1, 67.13, 452.2, 455/522, 69
See application file for complete search history.

(56) References Cited

U.S. PATENT DOCUMENTS

| | | | |
|---|---|---|---|
| 8,750,167 B2 | 6/2014 | Waheed | |
| 8,798,562 B2 | 8/2014 | Kopikare et al. | |
| 2006/0046668 A1* | 3/2006 | Uratani | H03F 1/0205 455/127.5 |
| 2008/0113622 A1* | 5/2008 | Lee | H04B 17/309 455/62 |
| 2009/0004981 A1 | 1/2009 | Eliezer et al. | |

FOREIGN PATENT DOCUMENTS

| | | |
|---|---|---|
| EP | 1473885 A1 | 11/2004 |
| EP | 3082367 A1 | 10/2016 |
| WO | 2007104341 A1 | 9/2007 |
| WO | 2015103936 A1 | 7/2015 |

OTHER PUBLICATIONS

Pavon, JDP, et al., "Link Adaptation Strategy for IEEE 802.11 WLAN via Received Signal Strength Measurement," IEEE International Conference on Communications, 2003, May 11-15, 20013; Anchorage, AK; pp. 1108-1113, vol. 2.

Qiao, D. et al., "MiSer: An Optimal Low-Energy Transmission Strategy for IEEE 802.11a/h," MobiCom '03; Sep. 14-19, 2003; San Diego, CA; ACM 1-58113-753-2; downloaded from <<home.eng.iastate.edu/~daji/papers/mobicom2003.pdf>> on May 16, 2016; 15 pages.

(Continued)

*Primary Examiner* — John J Lee (57) ABSTRACT

A method includes determining a quality indicator designating a quality of packet reception at a wireless local area network transceiver. A Modulation and Coding Scheme (MCS) index value is selected based on the quality indicator. A supply voltage provided to a radio frequency power amplifier is determined based on the quality indicator.

26 Claims, 8 Drawing Sheets

(56) References Cited

OTHER PUBLICATIONS

Qiao, D. et al., "Energy-Efficient PCF Operation of IEEE 802.11a Wireless LAN," Computer Networks 42 (2003); downloaded from <<https://kabru.eecs.umich.edu/papers/publications/2002/qiao_infocom02.pdf>> on May 16, 2016; 16 pages.
U.S. Appl. No. 15/260,926; "Communication Link Adjustments in Wireless Networks Based Upon Composite LQI Measurements," Mihai-Ionut, et al.; filed Sep. 9, 2016.

\* cited by examiner

METHOD FOR LINK ADAPTATION AND POWER AMPLIFIER VOLTAGE CONTROL AND SYSTEM THEREFOR

FIELD OF THE DISCLOSURE

This disclosure relates generally to wireless communication systems, and more particularly to link adaptation and power amplifier voltage control at a wireless communication device.

BACKGROUND

Link adaptation, or adaptive modulation and coding, is a term used in wireless communications to denote the matching of the modulation, coding and other signal and protocol parameters to the conditions on the radio link. The performance of a wireless data communication system can be limited by path-loss, interference due to signals coming from other transmitters, sensitivity of the receiver, available transmitter power margin, and the like. A wireless local area network (WLAN) communication system can use an algorithm that adapts the modulation and coding scheme according to the quality of the radio channel, thereby improving the bit rate and robustness of data transmission. The performance of a communication system can be measured based on link data rate, network capacity, range, power consumption, and the like. The process of link adaptation is a dynamic one and the signal and protocol parameters change as the radio link conditions change. This is especially true for a mobile device, as a user's distance from a wireless access hub transmitter is likely to vary over time. Link adaptation can utilize channel state information provided by a transmitter, such as a WLAN access point, however legacy systems may not provide this state information. Accordingly, link adaptation can be provided based only on reception parameters and analytics determined by a WLAN node.

Mobile communication devices are typically powered by an included battery having limited capacity. One approach to reducing power consumption that has been proposed is to employ envelope tracking, wherein a voltage provided to an RF power amplifier is configured to track the actual waveform of the modulated radio frequency signal provided to an antenna. However, the envelope tracking approach is both difficult and expensive to implement, rendering implementation impractical. Accordingly, other techniques for reducing power dissipation in a wireless transceiver are needed. In some situations, it may be necessary to compromise data rate, range, and other performance metrics in order to conserve power. For example, a device may simply limit transmit power to a fixed, reduced, level.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

FIGS. 1-9 illustrate techniques for controlling an average voltage level supplied to a radio-frequency power amplifier based on a derived quality indicator. The quality indicator is configured to track one or more radio signal reception characteristics, for example a received signal strength indicator (RSSI), a packet error ratio (PER), an error vector magnitude (EVM), a signal-to-noise ratio (SNR), and the like. In particular, the power amplifier supply voltage level can be determined in concert with link adaptation protocols to provide average power tracking to improve energy efficiency in wireless local area networks. The techniques disclosed herein are described in the context of the Institute of Electrical and Electronics Engineers (IEEE) 802.11 specification for wireless networking, but are applicable to other wireless communication transceivers. Moreover, these techniques can be implemented on legacy infrastructures that do not support hand-shaking protocols between a wireless device and an associated wireless access point, such as systems compliant with specifications 802.11a, 802.11b, 802.11g, and the like. In addition, the disclosed techniques can be integrated with support for transmit power control (TPC). In contrast to envelope tracking technology where power amplifier voltage is configured to precisely track the waveform of a modulated output signal, the average power tracking techniques disclosed herein adjust the power amplifier supply voltage at a rate commensurate with a packet rate or slower, such as across a single burst.

Figure 1:
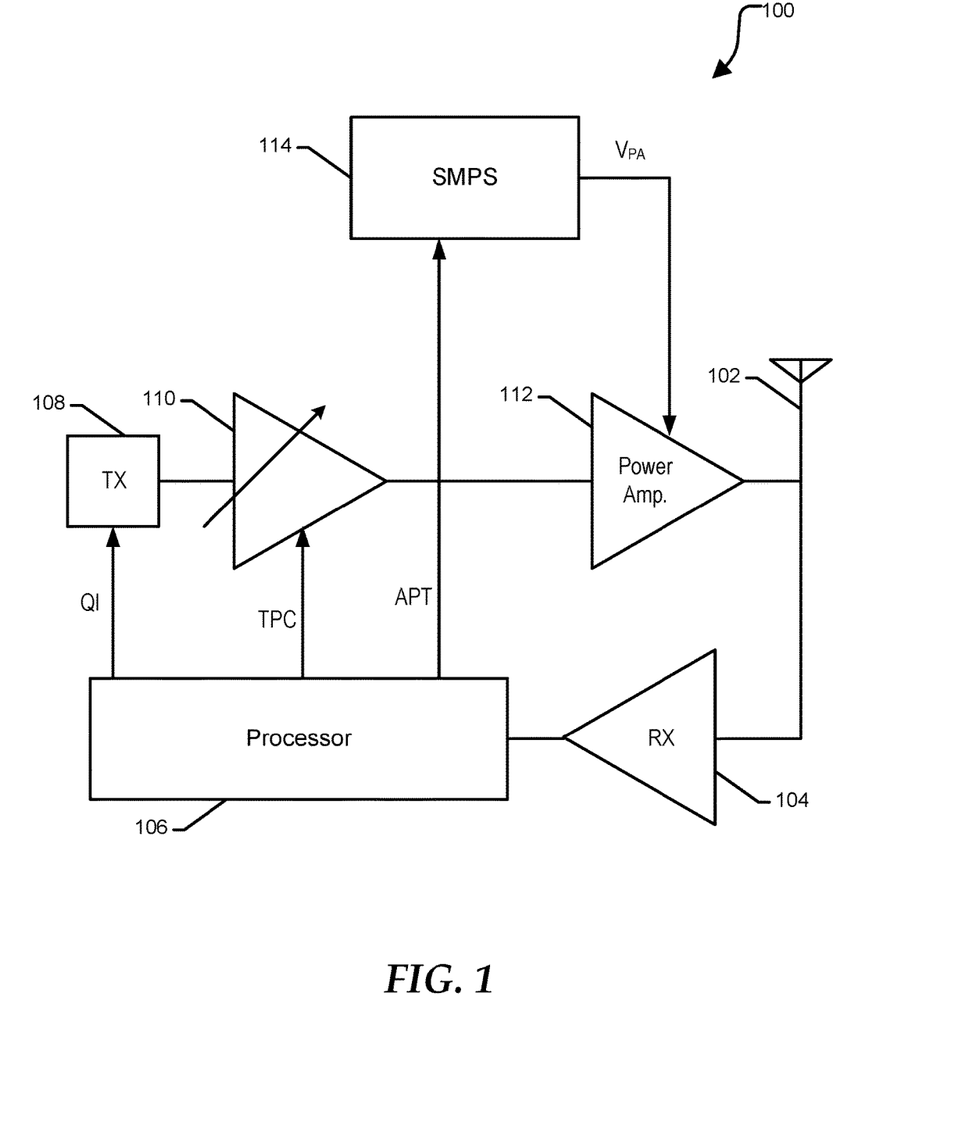
FIG. 1 is a block diagram illustrating a device including a wireless communication transceiver according to a specific embodiment of the present application.

FIG. 1 is a block diagram illustrating a device including a wireless communication transceiver 100 according to a specific embodiment of the present application. Transceiver 100 includes an antenna 102, a receive chain (RX) 104, a processor 106, a transmit chain (TX) 108, an exciter stage 110, a radio-frequency power amplifier 112, and a switch mode power supply 114. Transceiver 100 can be included in an information handling system that supports wireless data communications, such as a mobile computer connected to the Internet through a wireless local area network (WLAN). Benefits of the techniques disclosed herein are especially useful in mobile devices, such as a cellular telephone, where battery capacity is limited.

Antenna 102 is coupled to an input of receive chain 104 and to an output of power amplifier 110. Antenna 102 supports transmission and reception of a wireless data communication signal to/from a wireless access point, such as a router or modem providing a WLAN. Receiver chain 104 typically includes receiver front-end circuitry providing reception, filtering and intermediate or baseband frequency conversion. For clarity, specific details known in the art are not shown at FIG. 1. For example, receive chain 104 can include a signal processor to perform demodulation, de-mapping, bit de-interleaving, channel estimation and decoding, and the like. In addition, the receive chain 104 can determine signal and other reception characteristics, such as RSSI, SNR, PER, EVM, and other parameters that transceiver 100 may utilize to perform link adaptation.

Processor 106 includes an input coupled to an output of receiver chain 104, an output QI coupled to an input of transmit chain 108, an output TPC coupled to an input of exciter 110 to implement transmit power control, and an output coupled to SMPS 114 to provide an average power tracking signal APT. Processor 106 provides link adaptation functions, including adaptive modulation and coding scheme index selection based on various signal quality and error information received from receiver chain 104. For example, processor 106 can utilize a rate adaptation algorithm that adapts a modulation and coding scheme (MCS) index according to signal quality and channel performance. Link adaptation can utilize state information provided by the access point transmitter, but such information may not be provided if one or more nodes on the WLAN are only compliant with a legacy specification. Adaptive modulation systems can improve rate of transmission, and/or bit error rates, by adjusting an MCS index in response to varying reception quality and data throughput performance. The MCS index specifies the number of spatial streams, modulation type, coding rate, and channel bandwidth. Link adaptation protocols can be designed to optimize data throughput by balancing transmission rate with packet error rate. A packet error requires retransmission of the corresponding packet, diminishing performance.

In specific embodiments of the present disclosure, processor 106 is responsible for implementing a locally-inferred quality indicator (QI) that can be used to implement a link adaptation policy and also to modulate a supply voltage ($V_{PA}$) provided to power amplifier 112 to reduce transmission energy and improve energy efficiency. In particular, processor 106 can perform link adaptation in concert with average power tracking (APT) to optimize the combination of throughput and power consumption. Operation of processor 106 is described in detail below with reference to FIGS. 2-9.

Transmit chain 108 can receive data from the information handling system (not shown) for transmission over the WLAN. Transmit chain 108 can include a transmit signal processor and modulation circuits as known in the art. Signal QI generated at processor 106 can provide the basis for determining a MCS index to be implemented by transmit chain 108. Exciter 110 includes an input for receiving a low-level modulated signal from transmit chain 108, and an input for receiving the transmit power control signal TPC. An output signal of exciter 110 is amplified by power amplifier 112 for transmission via antenna 102. A supply voltage $V_{PA}$ for power amplifier 112 is generated by SMPS 114 based on the average power tracking signal APT generated by processor 106 based on the quality indicator QI.

Figure 2:
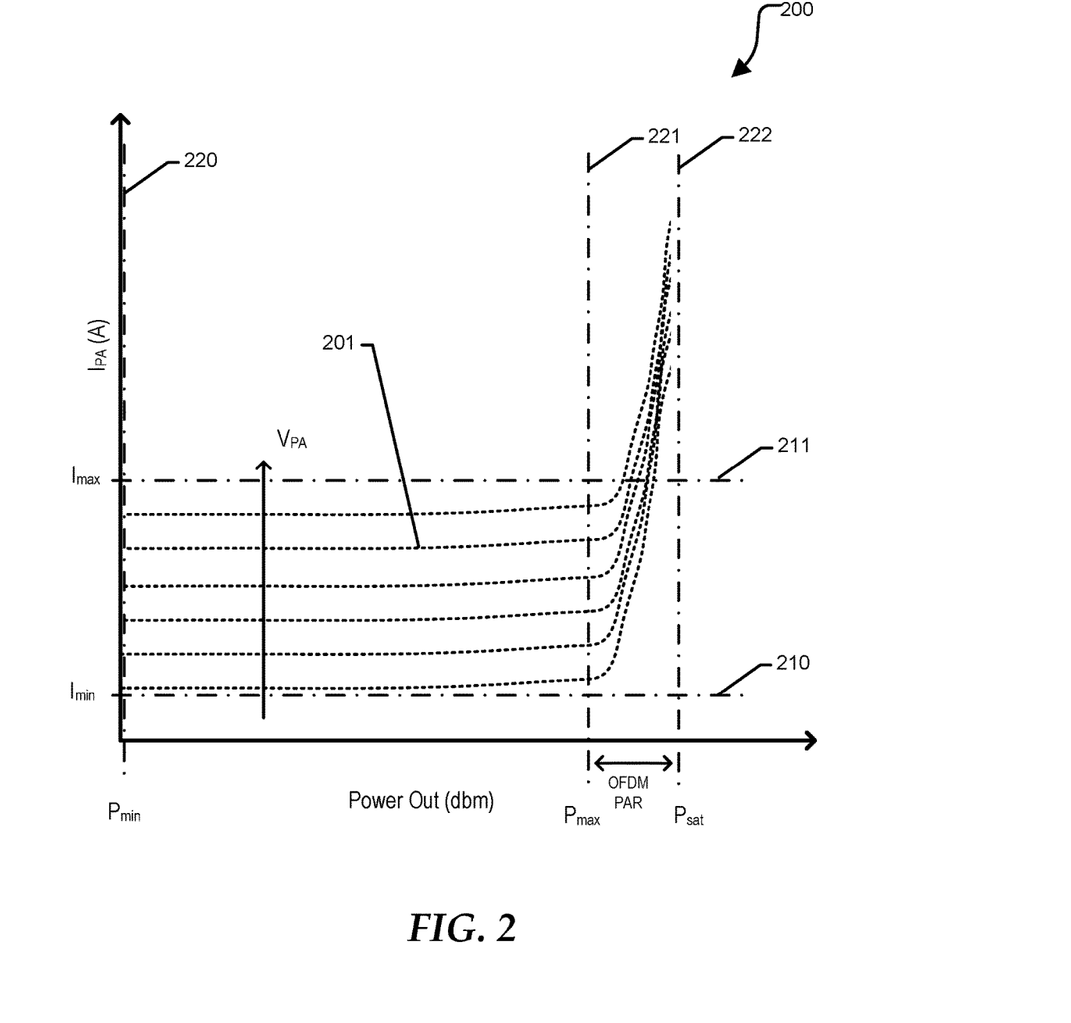
FIG. 2 is a graph illustrating power dissipation at the transceiver of FIG. 1 as a function of power amplifier voltage, according to a specific embodiment of the present application.

FIG. 2 is a graph 200 illustrating power dissipation at transceiver 100 of FIG. 1 as a function of power amplifier supply voltage, according to a specific embodiment of the present application. Graph 200 includes a horizontal axis representing power output of power amplifier 112, and a vertical axis representing electric current supplied to power amplifier 112. Graph 200 includes a set of curves illustrating the power amplifier current corresponding to variations in the power amplifier supply voltage $V_{PA}$. Reference 210 indicates a current $I_{min}$ corresponding to a minimum value of $V_{PA}$, while reference 211 indicates a current $I_{max}$ corresponding to a maximum value of signal $V_{PA}$. For example, $I_{min}$ can correspond to a supply voltage $V_{PA}$ of 1.2 volts, while $I_{max}$ can correspond to a supply voltage $V_{PA}$ of 2.8 volts. Reference 220 indicates a minimum power level, $P_{min}$, and reference 221 indicates a maximum desired power level $P_{max}$, provided by power amplifier 112. Over the range between $P_{min}$ and $P_{max}$, transistors included in power amplifier 112 are operating substantially linearly. At power levels greater than $P_{max}$, the transistors at power amplifier 112 enter an operating region known as saturation, $P_{sat}$, indicated by region between reference 221 and reference 222, where operation of the transistors is increasingly non-linear. A significant power back-off from Psat is maintained in an orthogonal frequency-division multiplexing (OFDM) compliant wideband digital communication system, known as a peak to average ratio (PAR). OFDM PAR is typically 10 dB, dropping typical power amplifier efficiency to below 10%. However, by regulating the level of supply voltage $V_{PA}$ as disclosed herein, transmitter efficiency can be improved compared to systems having a fixed power amplifier supply voltage. In particular, supply voltage $V_{PA}$ can be adjusted in concert with selection of an MCS index to provide the most power-efficient combination of MCS index, $V_{PA}$ and transmission power.

Figure 3:
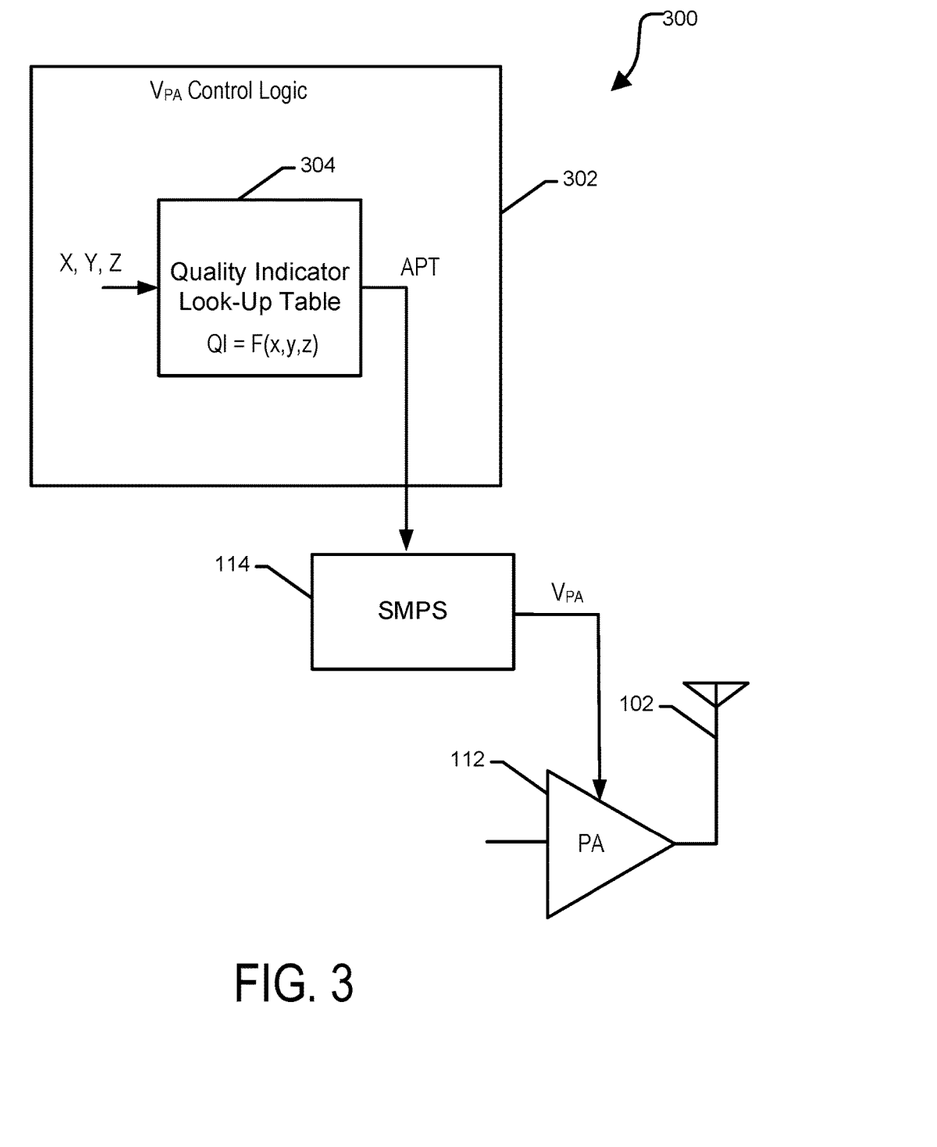
FIG. 3 is a block diagram illustrating average power tracking based on a quality indicator derived from reception characteristics, according to a specific embodiment of the present application.

FIG. 3 is a block diagram 300 illustrating average power tracking based on a quality indicator derived from reception characteristics, according to a specific embodiment of the present application. Diagram 300 includes $V_{PA}$ control logic 302, SMPS 114, power amplifier 112, and antenna 102. $V_{PA}$ control logic 302 includes a look-up table 304, which is configured to generate average power tracking signal APT based on one or more radio signal reception characteristics, represented by variables X, Y, and Z. The signal reception characteristics can include RSSI, SNR, PER, EVM, and other parameters corresponding to reception or data throughput. Look-up table 304 can be configured to regulate signal APT directly. Alternatively, look-up table 304 can determine a value of the quality indicator QI, and signal APT can be generated based on quality indicator QI. In one embodiment, look-up table 304 can be programmable, to define how each of parameters X, Y, and Z contributes to determining the quality indicator QI and signal APT. One of skill will appreciate that another software or hardware technique can be utilized to generate quality indicator QI and signal APT based on the signal characteristics.

Received signal strength indicator, RSSI, is a measurement of power present in a received radio signal, and can be determined at receive chain 104 of FIG. 1. RSSI is typically measured in the intermediate frequency (IF) stage, but can be determined in the baseband signal chain. Specification 802.11 also includes definition of a received channel power indicator (RCPI), which is a measure of the received radio frequency power in a selected channel over the preamble and the entire received frame. RSSI and RCPI, while indicative of reception power, may not always correlate with overall transmission quality, for example due to interference.

Signal to noise ratio, SNR, is a measure comparing the level of a desired signal to the level of background noise. It is defined as the ratio of signal power to the noise power, often expressed in decibels. A ratio higher than 1:1 (greater than 0 dB) indicates more signal than noise. The SNR is related to bandwidth and channel capacity by the Shannon-Hartley theorem.

Packet error ratio, PER, is the number of incorrectly received data packets divided by the total number of received packets. A packet is declared incorrect if at least one bit is erroneous. PER, and bit error rate (BER) may be affected by transmission channel noise, interference, distortion, bit synchronization problems, attenuation, wireless multipath, and the like. PER affects data throughput because the packet exhibiting an error requires retransmission.

Error vector magnitude, EVM, is a measure used to quantify the performance of a digital radio transmitter or receiver. EVM indicates how ideally constellation points are located, for example, how far the constellation points deviate from the ideal locations. EVM can be referred to as receive constellation error (RCE). Noise, distortion, spurious signals, and phase noise all degrade EVM, and therefore EVM provides a comprehensive measure of the quality of the radio receiver or transmitter for use in digital communications. An error vector is a vector in the I-Q plane between the ideal constellation point and the point received by the receiver. The average power of the error vector, normalized to signal power, is the EVM.

Each of the parameters RSSI, SNR, PER, and EVM can be used alone, or in combination with one or more other parameters, to determine the quality indicator QI disclosed herein. For example, look-up table 304 can define weightings for each parameter, the weightings identifying how much each parameter contributes to the quality indicator. While a look-up table is shown for simplicity, one of skill will appreciate that the contributory weight and influence on the quality indicator can be calculated using an equation or algorithm.

Figure 4:
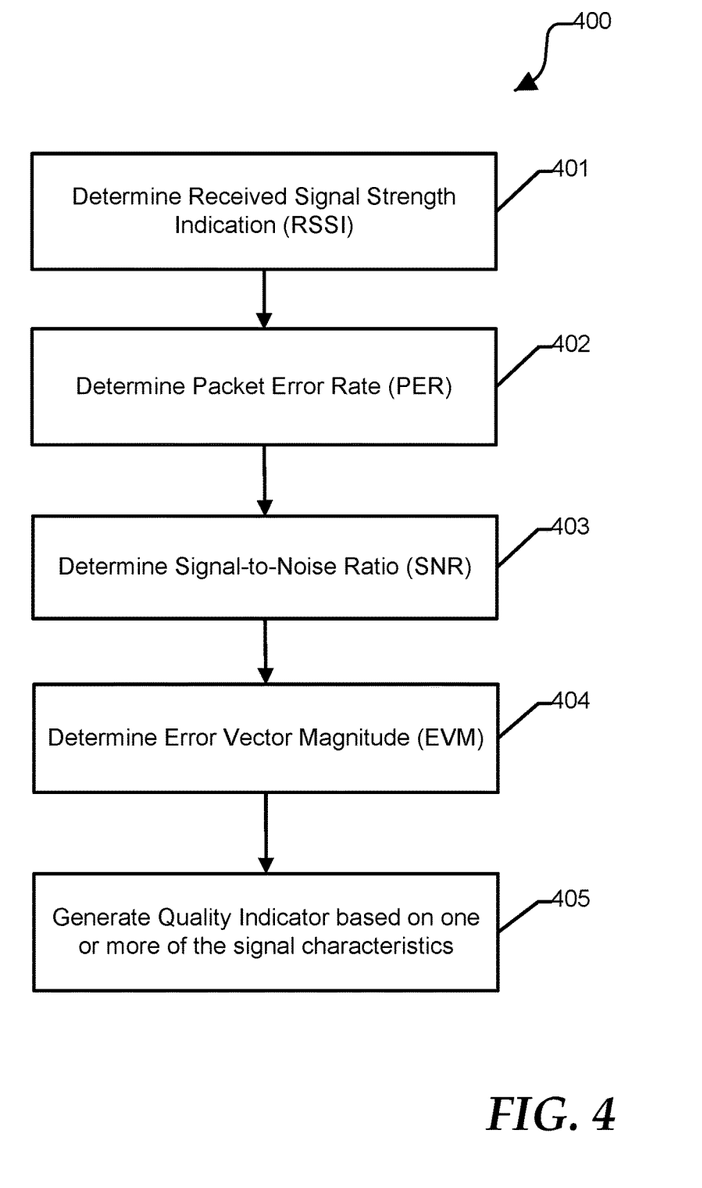
FIG. 4 is a flow diagram illustrating a method for generating the quality indicator of FIG. 1 according to a specific embodiment of the present application.

FIG. 4 is a flow diagram illustrating a method 400 for generating the quality indicator of FIG. 1 according to a specific embodiment of the present application. Method 400 begins at block 401 where a received signal strength indicator (RSSI) is determined at a receive chain based on characteristics of a signal received at a wireless communication receiver. The method continues at block 402 where a packet error ratio (PER) is determined based on a number of packet errors encountered during reception of packetized data. At block 403, a signal-to-noise ratio (SNR) is determined based on the received signal strength and the noise level. At block 404, an error vector magnitude (EVM) is determine based on the reception characteristics. In one embodiment, the signal characterization parameters can be collected at an interval corresponding to a single packet. In another embodiment, the signal characterization parameters can be collected at an interval corresponding to transmission of multiple packets, such as an interval corresponding to a burst or longer. Method 400 completes at block 405 where a quality indicator is generated based on one or more of the parameters determined at blocks 402-404. As with the determination of the signal characteristics, generation of the quality indicator can be performed at an interval corresponding to a single packet, an interval corresponding to transmission of multiple packets, or less frequently. Note that only those parameters used to calculate the QI value need to be determined, and FIG. 4 illustrates a particular embodiment where four exemplary parameters are used.

Figure 5:
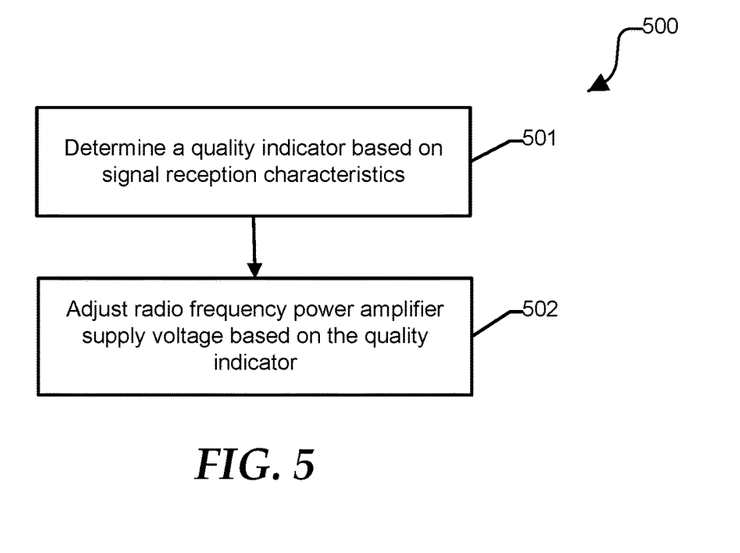
FIG. 5 is a flow diagram illustrating a method for adjusting a power amplifier voltage according to a specific embodiment of the present application.

FIG. 5 is a flow diagram illustrating a method 500 for adjusting a power amplifier voltage according to a specific embodiment of the present application. Method 500 begins at block 501 where a quality indicator is determined based on signal reception characteristics. For example, one or more reception characteristics, such as RSSI, SNR, PER, and EVM can be evaluated and used to generate the quality indicator. Method 500 proceeds to block 502 where a supply voltage to a radio frequency power amplifier is adjusted based on the quality indicator. For example, processor 106 can evaluate the one or more signal characteristics to determine a quality indicator QI, and the corresponding average power tracking signal APT. Signal APT configures SMPS 114 to output a desired power amplifier supply voltage $V_{PA}$. A particular value of $V_{PA}$ is maintained throughout the duration of the transmission of a data packet, or longer. In one embodiment, a larger value of QI can correspond to a reduction in the value of $V_{PA}$. The translation function relating QI to $V_{PA}$ can be linear, non-linear, continuous, or discontinuous. In another embodiment, a value of $V_{PA}$ can be configured to both decrease and increase over specific ranges of the quality indicator.

Figure 6:
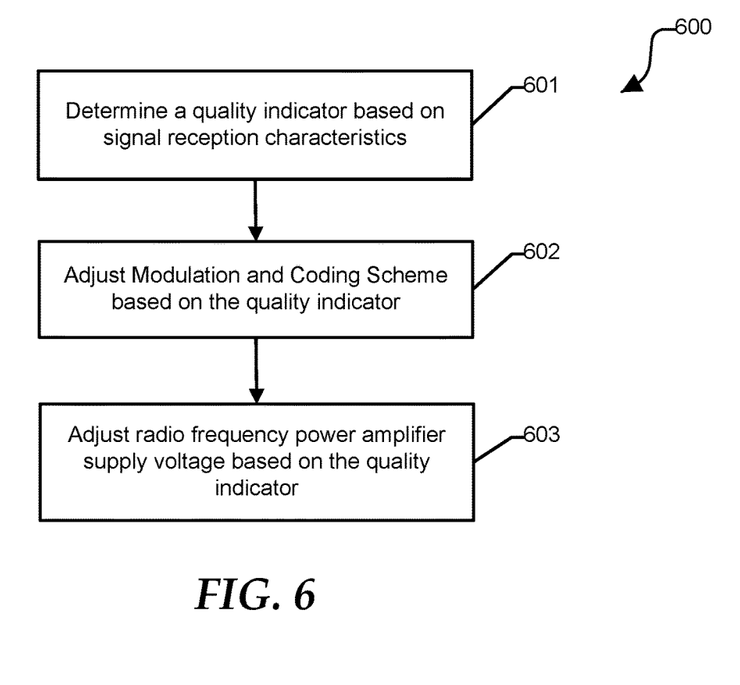
FIG. 6 is a flow diagram illustrating a method for adjusting a power amplifier voltage and a modulation coding scheme according to a specific embodiment of the present application.

FIG. 6 is a flow diagram illustrating a method 600 for adjusting a power amplifier voltage according to another embodiment of the present application. Method 600 begins at block 601 where a quality indicator is determined based on signal reception characteristics. For example, one or more reception characteristics, such as RSSI, SNR, PER, and EVM can be evaluated and used to generate the quality indicator. The method continues at block 602 where a modulation and coding scheme (MCS) index is adjusted based on the quality indicator. Method 600 proceeds to block 603 where a supply voltage to radio frequency power amplifier is adjusted based on the quality indicator. For example, a link adaptation policy can incorporate variations in power amplifier voltage in concert with selection of a desired MCS index.

Figure 7:
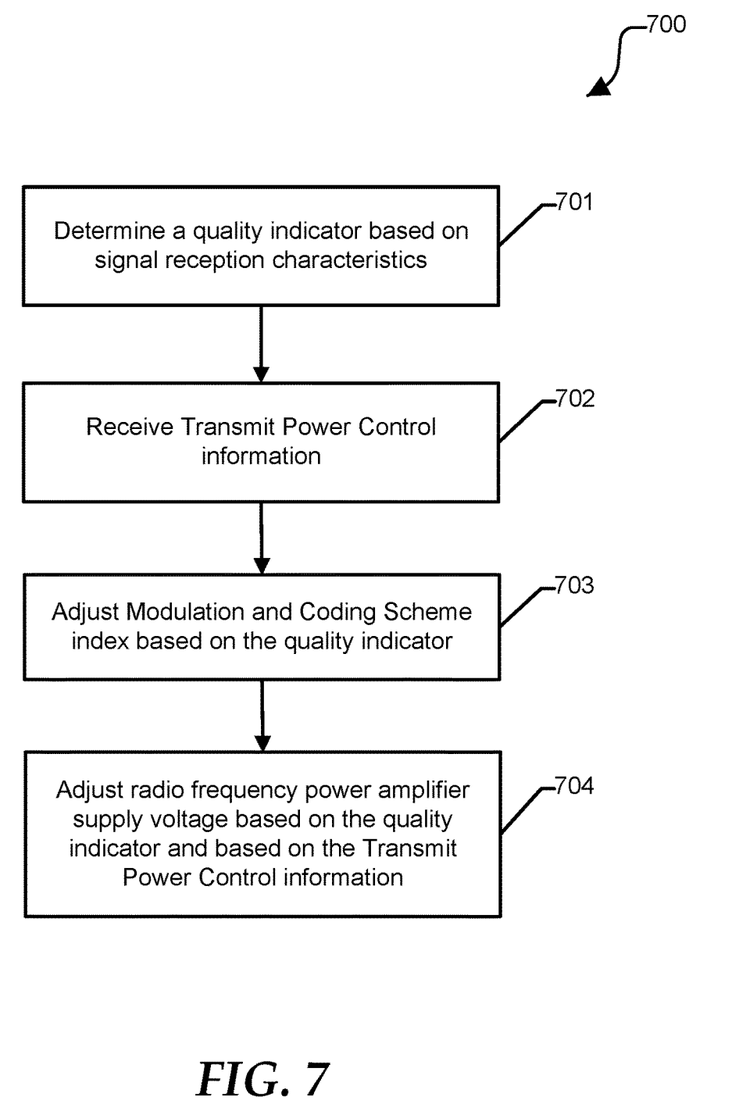
FIG. 7 is a flow diagram illustrating a method for adjusting a power amplifier voltage and a modulation coding scheme according to another embodiment of the present application.

FIG. 7 is a flow diagram illustrating a method 700 for adjusting a power amplifier voltage and a modulation coding scheme according to a specific embodiment of the present application. Method 700 begins at block 701 where a quality indicator is determined based on signal reception characteristics such as RSSI, SNR, PER, and EVM. The method continues at block 702 where transmit power control (TPC) information is received. For example, a device including a wireless data transceiver may provide a user interface or a power-saving application for controlling transmitter power. At block 703, a modulation and coding scheme (MCS) index is adjusted based on the quality indicator. Method 700 concludes at block 704 where a supply voltage to radio frequency power amplifier is adjusted based on the quality indicator. For example, a link adaptation policy can incorporate variations in power amplifier voltage in concert with selection of a desired MCS index.

Figure 8:
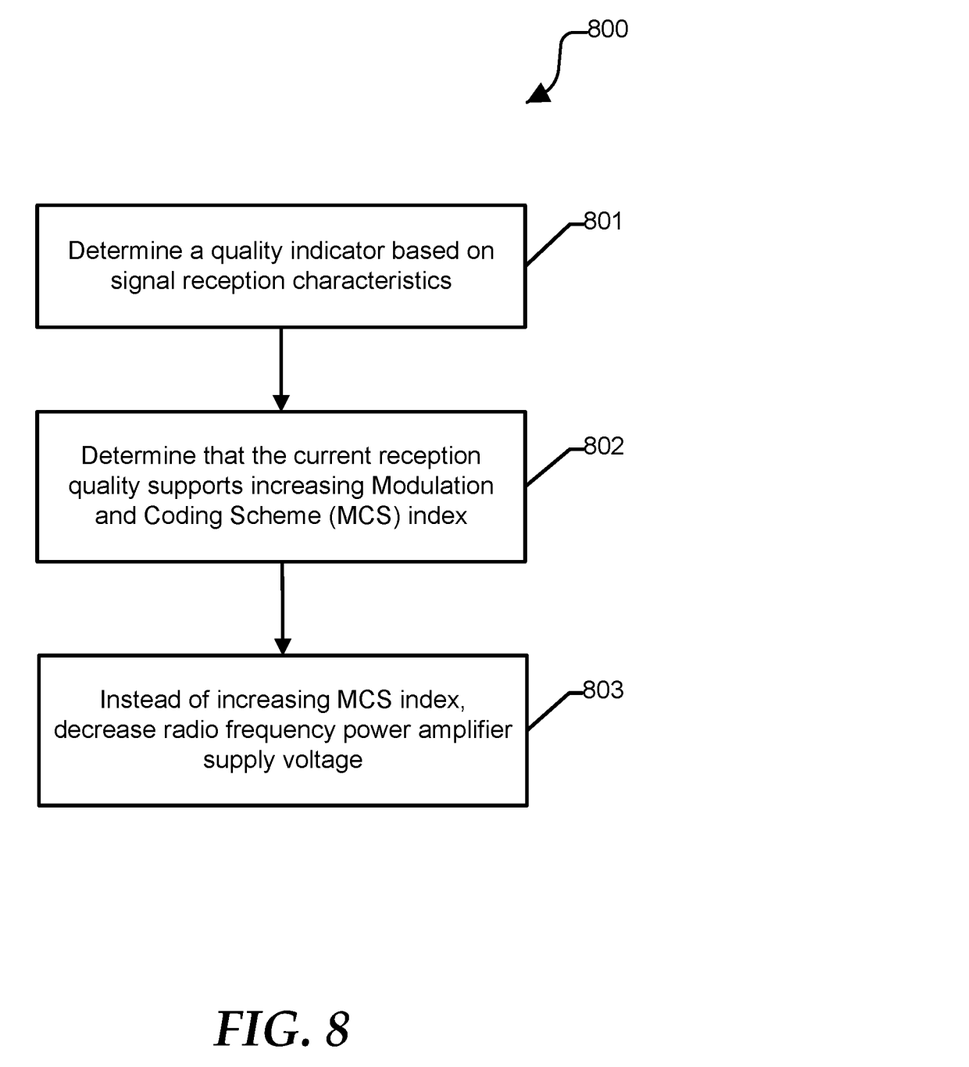
FIG. 8 is a flow diagram illustrating a method for adjusting a power amplifier voltage according to another embodiment of the present application.

FIG. 8 is a flow diagram illustrating a method 800 for adjusting a power amplifier voltage according to another embodiment of the present application. Method 800 begins at block 801 where a quality indicator is determined based on signal reception characteristics such as RSSI, SNR, PER, and EVM. The method continues at block 802 where it is determined that the current reception quality would support increasing a modulation and coding scheme (MCS) index. For example, when signal quality or other reception characteristics is favorable, additional data throughput may be provided by selecting a higher MCS index. Method 800 concludes at block 803 where, instead of increasing the MCS index, a supply voltage to a radio-frequency power amplifier is decreased. For example, a link adaptation algorithm can favor power conservation over maximizing data throughput.

Figure 9:
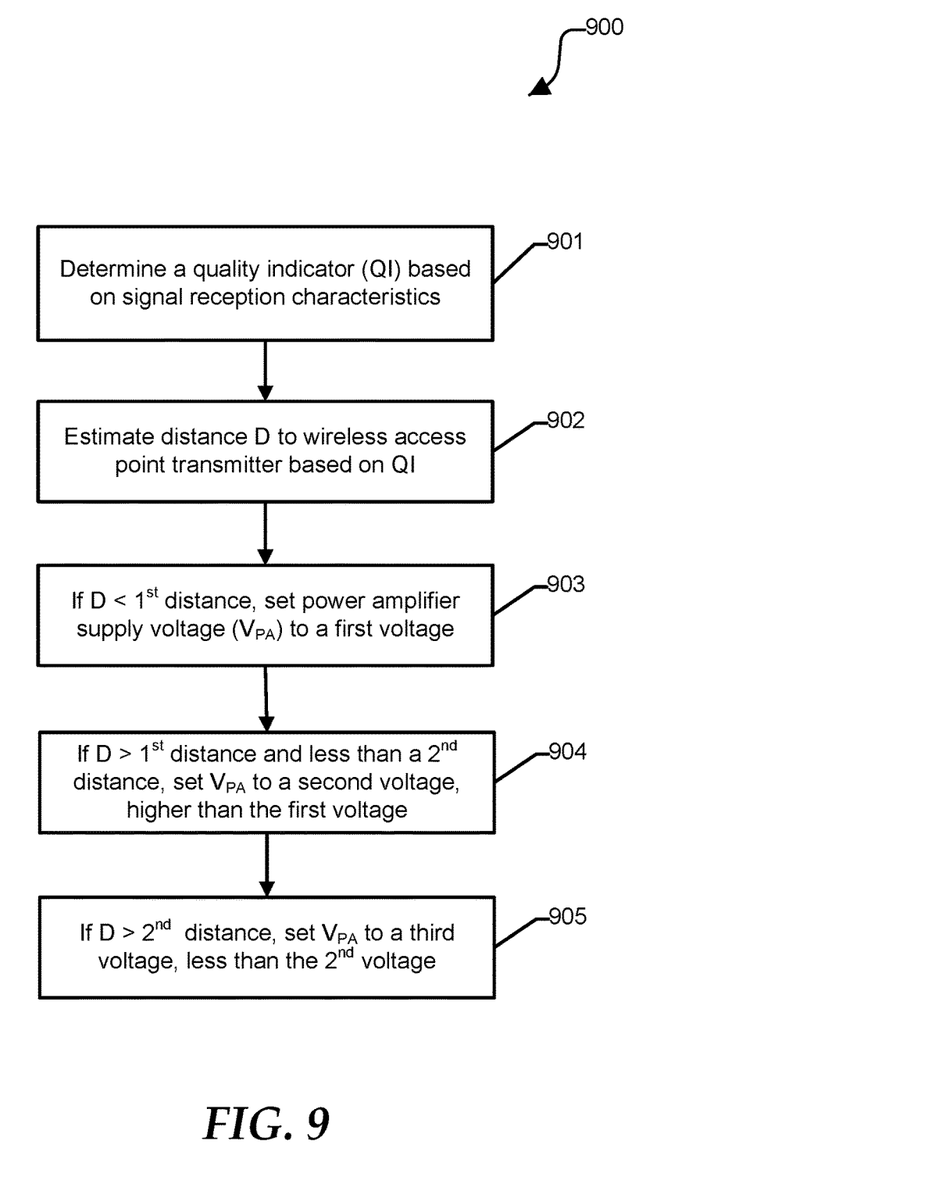
FIG. 9 is a flow diagram illustrating a method for adjusting a power amplifier voltage according to yet another embodiment of the present application.

FIG. 9 is a flow diagram illustrating a method 900 for adjusting a power amplifier voltage according to yet another embodiment of the present application. Method 900 begins at block 901 where a quality indicator is determined based on signal reception characteristics such as RSSI, SNR, PER, and EVM. The method continues at block 902 where a distance between a wireless data transceiver to an access point transmitter is estimated based on the quality indicator. At blocks 903-905, a supply voltage $V_{PA}$ provided to a radio-frequency power amplifier is adjusted based on the estimated distance. In particular, if the estimated distance is less than a first predetermined value, supply voltage $V_{PA}$ is set to a first value. If the estimated distance is greater than the first value and less than a second predetermined value, supply voltage $V_{PA}$ is set to a second value that is higher than the first value. If the estimated distance is greater than the second value, supply voltage $V_{PA}$ is set to a third value that is less than the second value.

In a first aspect, a method includes determining a quality indicator designating a quality of packet reception at a wireless local area network transceiver, selecting a Modulation and Coding Scheme (MCS) index value based on the quality indicator, and determining a supply voltage provided to a radio frequency power amplifier at the transceiver based on the quality indicator. In an embodiment of the first aspect, the quality indicator is determined based on one or more of a received signal strength indication (RSSI) measured at the transceiver, a packet error rate (PER) measured at the transceiver, an error vector magnitude (EVM) measured at the transceiver, and a signal-to-noise ratio (SNR) measured at the transceiver. In an embodiment of the first aspect, the supply voltage is determined based on one or more of a transmit power control (TPC) value, and a data transmission throughput at the transceiver. In an embodiment of the first aspect, the determined supply voltage is maintained for a period greater than the duration of transmission of a single data packet. In an embodiment of the first aspect, the method includes determining that a current quality of packet reception supports increasing the MCS index, and lowering the supply voltage instead of increasing the MCS index.

In a second aspect, a method includes determining a quality indicator designating a quality of packet reception at a wireless local area network transceiver, determining that a current quality of packet reception supports increasing a Modulation and Coding Scheme (MCS) index; and lowering a supply voltage provided to a radio frequency power amplifier at the transceiver instead of increasing the MCS index. In an embodiment of the second aspect, the quality indicator is determined based on one or more of a received signal strength indication (RSSI) measured at the transceiver, a packet error rate (PER) measured at the transceiver, an error vector magnitude (EVM) measured at the transceiver, and a signal-to-noise ratio (SNR) measured at the transceiver.

In a third aspect, a method includes determining a quality indicator designating a quality of packet reception at a wireless local area network transceiver, estimating a distance from the transceiver to a media access point generating in communication with the transceiver. A supply voltage provided to a radio frequency power amplifier at the transceiver is determined based on the estimated distance. If the distance is less than a first threshold distance, selecting a first supply voltage. If the distance is greater than the first threshold distance and less than a second threshold distance, selecting a second supply voltage greater than the first supply voltage. If the distance is greater than the second threshold distance, selecting a third supply voltage less than the second supply voltage. In an embodiment of the third aspect, the quality indicator is determined based on one or more of a received signal strength indication (RSSI) measured at the transceiver, a packet error rate (PER) measured at the transceiver, an error vector magnitude (EVM) measured at the transceiver, and a signal-to-noise ratio (SNR) measured at the transceiver.

In a fourth aspect, a wireless data communication system includes a receiver, a signal analytics device configured to determine a signal reception characteristic of the receiver, a processor configured to determine a quality indicator based on the reception characteristic, a radio-frequency power amplifier coupled to an antenna, and a power supply configured to provide a supply voltage to the power amplifier. The supply voltage provided to the power amplifier is determined based on the quality indicator. In an embodiment of fourth aspect, the quality indicator is determined based on one or more of a received signal strength indication (RSSI) measured at the transceiver, a packet error rate (PER) measured at the transceiver, an error vector magnitude (EVM) measured at the transceiver, and a signal-to-noise ratio (SNR) measured at the transceiver. In an embodiment of the fourth aspect, the supply voltage is maintained for a period greater than the duration of transmission of a single data packet.

The preceding description in combination with the Figures was provided to assist in understanding the teachings disclosed herein. The discussion focused on specific implementations and embodiments of the teachings. This focus was provided to assist in describing the teachings, and should not be interpreted as a limitation on the scope or applicability of the teachings. However, other teachings can certainly be used in this application. The teachings can also be used in other applications, and with several different types of architectures.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the

What is claimed is:

1. A method comprising:
   determining a quality indicator designating a quality of packet reception at a wireless local area network transceiver;
   estimating a distance from the transceiver to a media access point transmitter in communication with the transceiver based on the quality indicator; and
   determining a supply voltage provided to a radio frequency power amplifier at the transceiver, wherein
      if the distance is less than a first threshold distance, selecting a first supply voltage;
      if the distance is greater than the first threshold distance and less than a second threshold distance, selecting a second supply voltage greater than the first supply voltage; and
      if the distance is greater than the second threshold distance, selecting a third supply voltage less than the second supply voltage.

2. The method of claim 1, wherein the quality indicator is determined based on a received signal strength indication (RSSI) measured at the transceiver.

3. The method of claim 1, wherein the quality indicator is determined based on a packet error rate (PER) measured at the transceiver.

4. The method of claim 1, wherein the quality indicator is determined based on an error vector magnitude (EVM) measured at the transceiver.

5. The method of claim 1, wherein the quality indicator is determined based on a signal-to-noise ratio (SNR) measured at the transceiver.

6. The method of claim 1, further comprising determining the supply voltage based on a transmit power control (TPC) value.

7. The method of claim 1, further comprising determining the supply voltage based on a data transmission throughput at the transceiver.

8. A method comprising:
   determining a quality indicator designating a quality of packet reception at a wireless local area network transceiver;
   selecting a Modulation and Coding Scheme (MCS) index value based on the quality indicator; and
   determining a supply voltage provided to a radio frequency power amplifier at the transceiver based on the quality indicator, further comprising maintaining the determined supply voltage for a period greater than the duration of transmission of a single data packet.

9. The method of claim 1, further comprising:
   determining that a current quality of packet reception supports increasing the MCS index; and
   lowering the supply voltage instead of increasing the MCS index.

10. The method of claim 8, wherein the quality indicator is determined based on at least one of a received signal strength indication (RSSI) measured at the transceiver.

11. The method of claim 8, wherein the quality indicator is determined based on a packet error rate (PER) measured at the transceiver.

12. The method of claim 8, wherein the quality indicator is determined based on an error vector magnitude (EVM) measured at the transceiver.

13. The method of claim 8, wherein the quality indicator is determined based on a signal-to-noise ratio (SNR) measured at the transceiver.

14. The method of claim 8, further comprising determining the supply voltage based on a transmit power control (TPC) value.

15. The method of claim 8, further comprising determining the supply voltage based on a data transmission throughput at the transceiver.

16. A method comprising:
   determining a quality indicator designating a quality of packet reception at a wireless local area network transceiver;
   determining that a current quality of packet reception supports increasing a Modulation and Coding Scheme (MCS) index; and
   lowering a supply voltage provided to a radio frequency power amplifier at the transceiver instead of increasing the MCS index.

17. The method of claim 16, wherein the quality indicator is determined based on a received signal strength indication (RSSI) measured at the transceiver.

18. The method of claim 16, wherein the quality indicator is determined based on a packet error rate (PER) measured at the transceiver.

19. The method of claim 16, wherein the quality indicator is determined based on an error vector magnitude (EVM) measured at the transceiver.

20. The method of claim 16, wherein the quality indicator is determined based on a signal-to-noise ratio (SNR) measured at the transceiver.

21. The method of claim 1, wherein determining the supply voltage is further based on the quality indicator.

22. A wireless data communication system comprising:
   a receiver;
   a signal analytics device configured to determine a signal reception characteristic of the receiver;
   a processor configured to determine a quality indicator based on the reception characteristic;
   a radio-frequency power amplifier coupled to an antenna; and
   a power supply configured to provide a supply voltage to the power amplifier, the supply voltage determined based on the quality indicator, wherein the signal reception characteristic is an error vector magnitude (EVM)).

23. The system of claim 22, wherein the signal reception characteristic is a received signal strength indication (RSSI).

24. The system of claim 22, wherein the signal reception characteristic is a packet error rate (PER).

25. A wireless data communication system comprising:
   a receiver;
   a signal analytics device configured to determine a signal reception characteristic of the receiver;
   a processor configured to determine a quality indicator based on the reception characteristic;
   a radio-frequency power amplifier coupled to an antenna; and
   a power supply configured to provide a supply voltage to the power amplifier, the supply voltage determined based on the quality indicator, wherein the supply voltage determined based on the quality indicator is maintained for a period greater than the duration of transmission of a single data packet.

26. The system of claim 25, wherein the signal reception characteristic is at least one of a received signal strength indication (RSSI) or a packet error rate (PER).

* * * * *